US008577701B1

(12) United States Patent
Howard et al.

(10) Patent No.: US 8,577,701 B1
(45) Date of Patent: Nov. 5, 2013

(54) SYSTEM AND METHOD FOR PROCESSING DATA RELATED TO INVESTMENT MANAGEMENT

(75) Inventors: Rodney R. Howard, Weatogue, CT (US); Patrick Alan Thornton, Tampa, FL (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/530,326

(22) Filed: Jun. 22, 2012

(51) Int. Cl.
*G06Q 40/00* (2012.01)

(52) U.S. Cl.
USPC ................................................ 705/4; 705/35

(58) Field of Classification Search
USPC ........................ 705/35, 36 R, 37, 4
See application file for complete search history.

(56) References Cited

U.S. PATENT DOCUMENTS

| | | | |
|---|---|---|---|
| 7,251,623 B1 * | 7/2007 | Ryan et al. ....................... | 705/35 |
| 7,447,651 B1 | 11/2008 | Herbst et al. | |
| 7,707,093 B2 | 4/2010 | O'Shaughnessy et al. | |
| 7,769,659 B2 | 8/2010 | Arena et al. | |
| 8,165,948 B2 | 4/2012 | O'Shaughnessy et al. | |
| 8,255,308 B2 * | 8/2012 | Dial et al. .................... | 705/36 R |
| 2004/0230505 A1 * | 11/2004 | Garlich et al. .................. | 705/35 |
| 2006/0085338 A1 * | 4/2006 | Stiff et al. ....................... | 705/40 |
| 2009/0099949 A1 * | 4/2009 | Ho et al. .......................... | 705/35 |
| 2009/0327155 A1 * | 12/2009 | Dial et al. .................... | 705/36 R |
| 2010/0005033 A1 | 1/2010 | Boyda et al. | |
| 2010/0131423 A1 * | 5/2010 | Meyer et al. ................ | 705/36 R |
| 2012/0030141 A1 | 2/2012 | Boyda et al. | |

* cited by examiner

*Primary Examiner* — Lalita M Hamilton
(74) *Attorney, Agent, or Firm* — Howard IP Law Group, PC

(57) ABSTRACT

A computer system for processing data related to investment management includes a data storage device storing data including an account value; a plurality of investments and, for each of the investments, one of a plurality of categories associated with the investments and a value of the investments; and a server. The server is configured to access the stored data; determine a proportion of the value of the investments in the at least one of the plurality of categories to the account value; compare the determined proportion to at least one of an upper threshold proportion and a lower threshold proportion; and responsive to determining that the determined proportion is in breach of either the upper threshold proportion or the lower threshold proportion, provide output data to a fund manager computer system with instructions to reallocate value so as to provide the proportion at a predetermined value.

20 Claims, 9 Drawing Sheets

| | Before Rebalance | | | | | | | After Rebalance | | | | | | |
|---|---|---|---|---|---|---|---|---|---|---|---|---|---|---|
| Qtr | Fund A | Fund B | Fund C | Fund D | Fund E | Total | Equity % | Fund A | Fund B | Fund C | Fund D | Fund E | Total | Equity % |
| 0 | | | | | | | | 70 | 420 | 210 | 210 | 90 | 1,000 | 70.0% |
| 1 | 69 | 412 | 206 | 216 | 93 | 995 | 68.9% | 69 | 412 | 206 | 216 | 93 | 995 | 68.9% |
| 2 | 67 | 399 | 200 | 227 | 97 | 990 | 67.2% | 67 | 399 | 200 | 227 | 97 | 990 | 67.2% |
| 3 | 77 | 419 | 210 | 216 | 92 | 1,014 | 69.6% | 77 | 419 | 210 | 216 | 92 | 1,014 | 69.6% |
| 4 | 80 | 524 | 241 | 205 | 88 | 1,138 | 74.3% | 80 | 478 | 239 | 239 | 102 | 1,138 | 70.0% |
| 5 | 78 | 468 | 234 | 246 | 106 | 1,133 | 68.9% | 78 | 468 | 234 | 246 | 106 | 1,133 | 68.9% |
| 6 | 70 | 422 | 211 | 259 | 111 | 1,072 | 65.6% | 70 | 422 | 211 | 259 | 111 | 1,072 | 65.6% |
| 7 | 49 | 232 | 105 | 284 | 122 | 793 | 48.8% | 40 | 238 | 119 | 277 | 119 | 793 | 50.0% |
| 8 | 36 | 214 | 107 | 272 | 117 | 745 | 47.9% | 37 | 224 | 112 | 261 | 112 | 745 | 50.0% |
| 9 | 43 | 257 | 129 | 274 | 117 | 820 | 52.3% | 43 | 257 | 129 | 274 | 117 | 820 | 52.3% |
| 10 | 49 | 296 | 148 | 288 | 123 | 904 | 54.5% | 49 | 296 | 148 | 288 | 123 | 904 | 54.5% |
| 11 | 57 | 340 | 170 | 302 | 129 | 998 | 56.8% | 57 | 340 | 170 | 302 | 129 | 998 | 56.8% |
| 12 | 65 | 391 | 195 | 317 | 136 | 1,105 | 59.0% | 65 | 391 | 195 | 317 | 136 | 1,105 | 59.0% |

| | Equity | | | Fixed | | |
|---|---|---|---|---|---|---|
| Model | Fund A | Fund B | Fund C | Fund D | Fund E | Total |
| Rebal 70/30 | 7% | 42% | 21% | 21% | 9% | 100% |
| Rebal 50/50 | 5% | 30% | 15% | 35% | 15% | 100% |

*Fig. 6*

SYSTEM AND METHOD FOR PROCESSING DATA RELATED TO INVESTMENT MANAGEMENT

FIELD OF INVENTION

The present invention relates to computer systems, and particularly to computer systems for use in the financial services field, and particularly for processing of data related to investment management.

BACKGROUND

Managed investment portfolios are employed in a variety of contexts. In an example, an investor may contract with a financial services entity to provide investment of funds. In some instances, the financial services entity may be providing management of an investment portfolio with a particular goal that is not necessarily contractually guaranteed. For example, the investment portfolio may be in the form of a target date fund, in which funds are typically reallocated so as to reduce weighting toward equities as the target date is approached, thereby balancing risk of loss of account value due to poor equity market performance against the risk of failing to meet desired account values. By way of further example, the contract may include one or more guarantees associated with the performance of the investment portfolio. For example, an investment fund, such as a hedge fund, a mutual fund qualified under the Investment Act of 1940 or a fund of mutual funds or other investments, may have a contractual or insurance product associated guarantee. Such guarantees may include guarantees of a minimum income over a time period, a guarantee of a minimum account balance by a certain date, or other guarantees.

In still other examples, the financial services entity may be an insurance company that makes annuity products available. Such annuity products may include variable annuities having guarantees, such as guarantees of minimum withdrawals, minimum account values, and/or combinations of such guarantees.

Systems that implement processing of data related to managed investment portfolios with improved management of risks relating to fluctuations in market value of portfolio components would be desirable.

SUMMARY

In an embodiment, a computer system for processing data related to investment management includes: one or more data storage devices storing data associated with a plurality of investment accounts, the data indicative of the investment accounts including, for each investment account: an account value; a plurality of investments and, for each of the investments, one of a plurality of categories associated with the investments and a value of the investments; and an investment management hardware server, in communication with the one or more data storage devices. The investment management hardware server is configured to, for each of the investment accounts: access the stored data indicative of the investments; determine a value of the investments in at least one of the plurality of categories; determine a proportion of the value of the investments in the at least one of the plurality of categories to the account value; compare the determined proportion to at least one of an upper threshold proportion and a lower threshold proportion; and responsive to determining that the determined proportion is in breach of either the upper threshold proportion or the lower threshold proportion, provide output data to a fund manager computer system with instructions to reallocate value between the categories so as to change the determined proportion to a predetermined allocation.

In embodiments, the value of the predetermined allocation may be stored in a memory location, such as in the data storage device. In an embodiment, the predetermined allocation may be equal to the breached one of the upper or lower threshold proportion. In an embodiment, the predetermined allocation may be between the upper and lower threshold proportions, and in embodiments may be the same allocation for a breach of either the upper or the lower threshold.

In an embodiment, a computer-implemented method for processing data includes accessing by an investment manager hardware server from a data storage device stored data indicative of investments, the stored data comprising data associated with a plurality of investment accounts, the data indicative of the investment accounts including, for each investment account: an account value; a plurality of investments and, for each of the investments, one of a plurality of categories associated with the investments and a value of the investments; determining by the server a value of the investments in at least one of the plurality of categories; determining by the server a proportion, of the value of the investments in the at least one of the plurality of categories, to the account value; comparing by the server the determined proportion to at least one of an upper threshold proportion and a lower threshold proportion; and responsive to determining that the determined proportion is in breach of either the upper threshold proportion or the lower threshold proportion, providing by the server output data to a fund manager computer system with instructions to reallocate value between the categories so as to change the determined proportion to a predetermined allocation.

In an embodiment, a non-transitory computer-readable medium has processor-executable instructions stored thereon relating to processing of data for investments, which instructions, when executed by the processor, cause the processor to: access from a data storage device stored data indicative of investments, the stored data comprising data associated with a plurality of investment accounts, the data indicative of the investment accounts including, for each investment account: an account value; a plurality of investments and, for each of the investments, one of a plurality of categories associated with the investments and a value of the investments; determine a value of the investments in at least one of the plurality of categories; determine a proportion, of the value of the investments in the at least one of the plurality of categories, to the account value; compare determined proportion to at least one of an upper threshold proportion and a lower threshold proportion; and responsive to determining that the determined proportion is in breach of either the upper threshold proportion or the lower threshold proportion, provide output data to a fund manager computer system with instructions to reallocate value between the categories so as to change the determined proportion to a predetermined allocation.

BRIEF DESCRIPTION OF DRAWINGS

FIG. 6 shows charts of exemplary allocations among funds within equity and fixed income categories in an embodiment of the invention.

DETAILED DESCRIPTION

Figure 1:
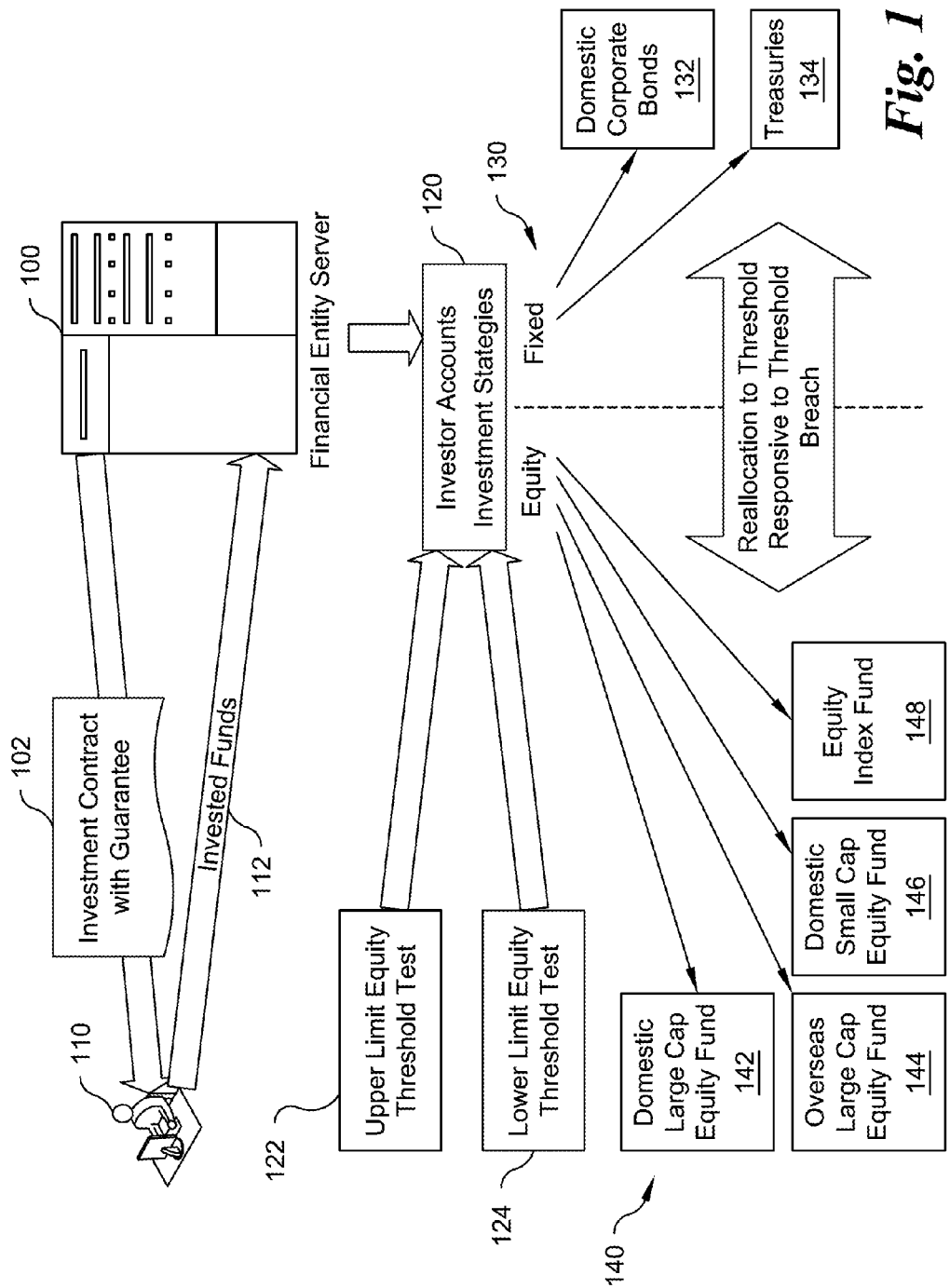
FIG. 1 is a schematic diagram showing a computer system for processing data related to investment allocations in an environment in which such a system may be implemented.

It is to be understood that the figures and descriptions of the present invention have been simplified to illustrate elements that are relevant for a clear understanding of the present invention, while eliminating, for the purpose of clarity, many other elements found in typical computer systems and methods for processing of data relating to managed investments, including, systems configured for automated rebalancing. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

In a managed investment account, in the prior art, a typical approach to an investment strategy that appropriately balances the possibility of favorable investment returns by participation in equity markets, against the risks of loss of principal from downturns in equity markets, and the risk of failing to meet goals by maintaining too much of one's assets in fixed return investments, is to set a target percentage of equity investments. An account is typically established with investments divided between equity and non-equity investments according to an initial allocation, which is the same as a target percentage. Thereafter, on a periodic basis, the current allocation of investments is determined and compared to the target. If the current allocation is not equal to the target percentage, then assets are sold and purchased until the current allocation is equal to the target percentage.

During periods of increasing equity values, at the time of each periodic determination of the allocation, the equity portion will be higher than the target, as a result of increasing equity values. Accordingly, equities are sold, and fixed income assets are purchased at the time of each periodic determination. In a rising market, equities are sold, and then increase in value after the sale, thereby depriving the investment account of the benefit of later increases in value.

During periods of decreasing equity values, at the time of each periodic determination of the allocation, the equity portion will be lower than the target, as a result of decreasing equity values. Accordingly, fixed income assets are sold, and equities are purchased at the time of each periodic determination. In a declining equity market, equities continue to decrease in value after the purchase, thereby causing the investment in the newly-purchased entities to decline in value.

In an embodiment, a computer system for administering an investment account has stored in memory an upper threshold and a lower threshold for the proportion of at least one category of investment. Exemplary categories include equity investments, domestic investments, international investments, fixed income investments, large cap equities, small cap equities, and other types of investments. On a periodic basis, the current proportion of investments in a category is determined, and then compared to one of the thresholds, and, if the first threshold is not breached, then to the other threshold. If neither of the thresholds is breached, then no rebalancing is performed. If either threshold is breached, then the assets are rebalanced, sufficiently to cause the proportions to reach a predetermined allocation, which may be the breached threshold or another value intermediate the thresholds. In embodiments, the rebalancing may reallocate until the proportions are a buffer amount or percentage from the breached threshold.

The term threshold is exemplary, and terms such as limit, maximum, minimum may be employed interchangeably.

Referring now to FIG. 1, an embodiment of a system for processing data related to managed investments is shown. Financial entity server 100 performs data processing on behalf of a financial services entity which has entered into an investment contract 102 with investor 110. Investor 110 is illustrated as an individual, but may be more than one individual, an entity such as a trust or corporation, or other type of legal entity. Investor 110 has provided investment funds 112 to the financial entity.

Financial entity server 100 processes data relating to investment accounts 120, which are managed in accordance with investment strategies. The data employed in management of the investment accounts includes upper limit equity threshold test 122 and lower limit equity threshold test 124. The data employed also includes data relating to a plurality of funds in two categories, which are fixed 130 and equity 140, in this example. Fixed income investments 130 include domestic corporate bonds 132 and Treasuries 134. Equity investments 140 include domestic large cap equity fund 142, overseas large cap equity fund 144, domestic small cap equity fund 146 and equity index fund 148. The financial entity server 100 is configured to allocate invested funds 112 initially to fixed investments 130 and equity investments 140 according to an initial ratio. Thereafter, the financial entity server 100 periodically compares the proportion between equity investments 140 and a total value of investments to the threshold tests 122, 124. If either of the tests indicates a breach of a threshold, then the server 100 reallocates funds between the fixed income investments 130 and equity investments 140, in a sufficient amount to maintain the ratio at the breached threshold.

Other categories of investments may include real estate investments, which may include equity interests held directly in real estate, real estate investment trusts, and other funds and investment arrangements for holding equity or other interests in real estate. Other categories of investments may include hedging investments, such as funds configured to provide a hedge against losses or excessive losses in a particular category. By way of example, a category may be include instruments designed to provide hedges against losses in one or more types of equities, such as by investing in options or other derivatives that increase in value responsive to losses in value in equity markets.

Figure 2:
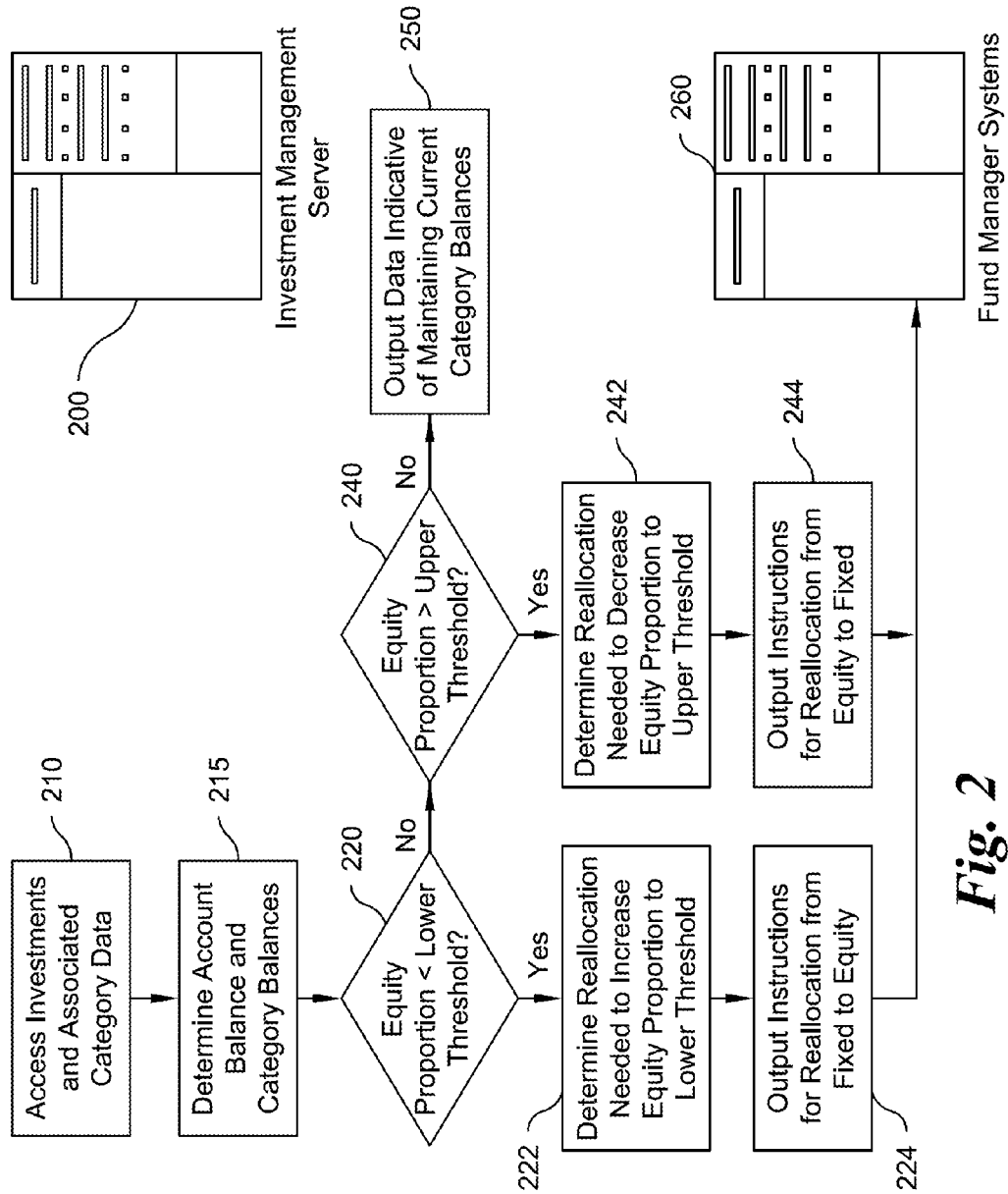
FIG. 2 is a process flow diagram of an embodiment of a method of the invention.

Referring now to FIG. 2, a process flow of an exemplary method of the invention will be described. Investment management server 200 executes process steps commencing with accessing 210 investments and associated category data. For example, for each investment account, or for a fund, the server 200 may access data indicative of current value of each investment of the account or server, and an associated category of each investment. In an embodiment, the investments may be in the form of mutual funds, which announce a share price on a daily cycle. In an embodiment, the server 200 may execute this process on a periodic basis, such as on the basis of a period in the range from one week to one calendar quarter (three months) inclusive. The process may be performed following the end of a business day cycle, such as in a batch process overnight, with generation of instructions for sale and purchase of investments, such as fund shares, dispatched at the beginning of the next trading day.

The server 200 determines 215 the balance of each account and the proportion of each category to the account value or fund value. The server 200 then compares the proportion of equity to the lower threshold 220. If the proportion is less than the lower threshold, then the server proceeds to determine 222 a reallocation needed to increase the equity proportion to the lower threshold. The reallocation determined may be a dollar value representing the difference between the current value of equity investments and the lower threshold multiplied by current account value. The determination may further include determining dollar amounts to be sold from particular fixed income funds or other fixed investments, and dollar amounts to be purchased in particular equity funds or other equity funds. The system may have stored criteria for selection of funds from which sales are to be made and to which proceeds are to be directed for rebalancing. Upon completion of the reallocation needed, the investment management server outputs 224 instructions for reallocation from fixed to equity, such as to a fund manager computer system 260. The instructions may include data including dollar values of one or more equity investments to be sold, and dollar values of one or more fixed income investments to be purchased. The instructions may be directed to more than one fund manager computer system 260, as, for example, an equity fund from which shares are to be sold may be managed by a first fund manager, and a fixed fund in which shares are to be purchased may be managed by a second, different, fund manager.

Responsive to determining that the equity proportion is not less than the lower threshold, the system proceeds to determine whether the equity proportion is greater than the upper threshold 240. Responsive to determining that the equity proportion is greater than the upper threshold, the system determines 242 reallocation needed to decrease the equity proportion to the upper threshold. The reallocation determined may be a dollar value representing the difference between the current value of equity investments and the upper threshold multiplied by current account value. The determination may further include determining dollar amounts to be sold from particular funds or other equity investments, and dollar amounts to be sold from particular funds. The system may have stored criteria for selection of funds from which sales are to be made and to which proceeds are to be directed for rebalancing.

Upon determination of the reallocation, the system outputs 244 instructions for reallocation from equity to fixed, such as to one or more fund manager systems 260.

Responsive to a determination that neither the upper threshold nor the lower threshold has been breached, the system may output 250 data indicative of maintaining current category balances. The data output may be saved in a data storage device, and may be provided to an account owner, financial advisor of an account owner, or the like, via electronic communication or printed communication.

Figure 3:
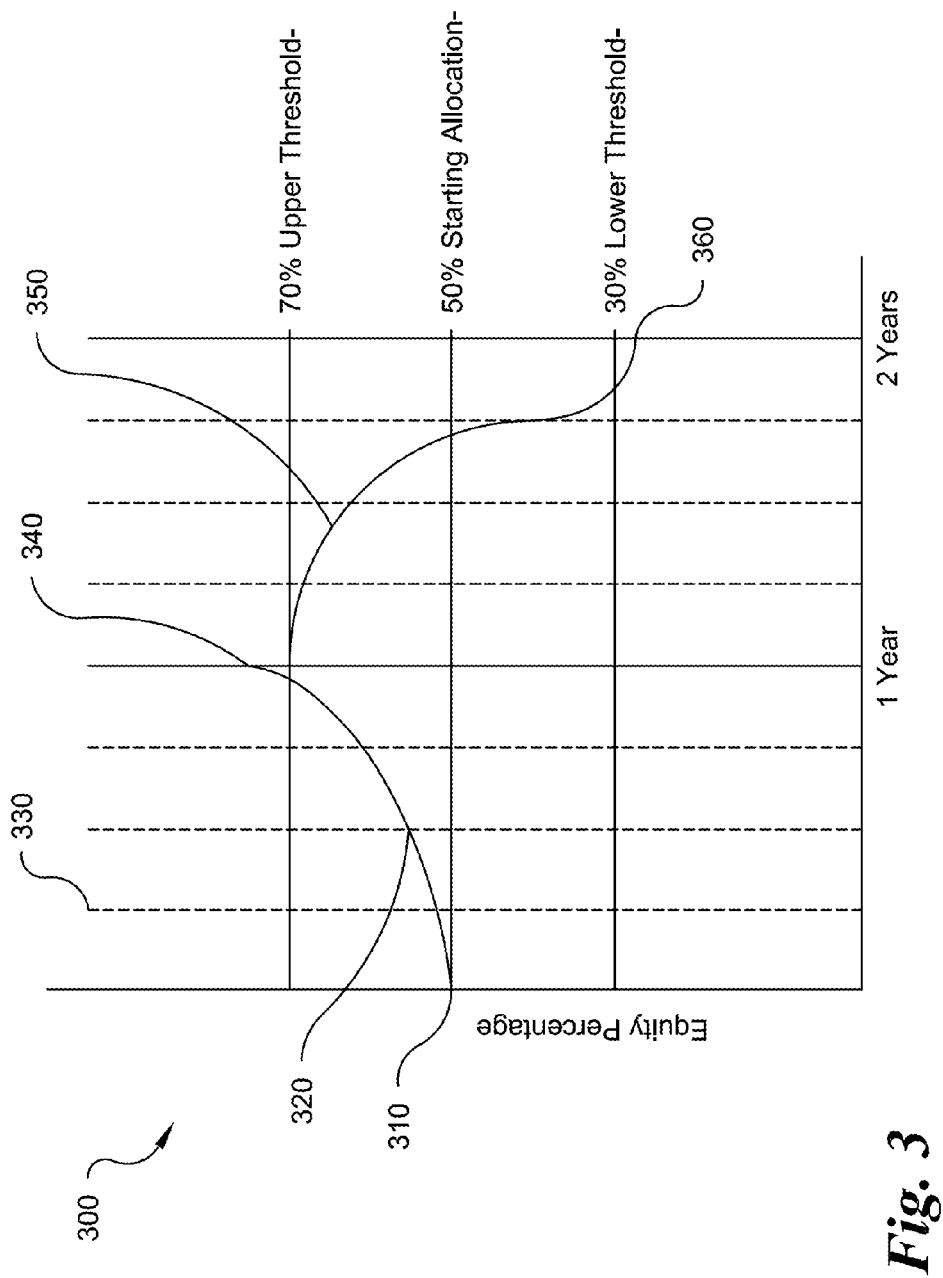
FIG. 3 is a graph showing exemplary equity percentages relative to upper and lower thresholds over time in an implementation of the invention.

Referring now to FIG. 3, a chart 300 is shown, demonstrating an exemplary implementation of a system and method of the invention. In this example, a starting allocation of 310 at establishment of an investment account, such as a variable annuity account, target date fund, or other investment account, is shown. The starting allocation is 50% equity as a share of total account value. In the first year, the equity percentage 320 rises rapidly. On a quarterly basis 330, the equity percentage is tested against the upper threshold of 70% and the lower threshold of 30% of account value. At the first three quarterly tests, the equity percentage 320 is between the upper and lower thresholds, and thus no rebalancing is performed. At the one year mark, as shown at 340, the equity percentage exceeds the upper threshold of 70%. As a result, the account is rebalanced, by sale of equity investments and purchase of fixed income investments, in sufficient amount to cause the equity percentage to be equal to the upper threshold. There is thus a sharp drop in the equity percentage at the one year mark.

During the second year, the equity percentage declines, as shown at 350. At the next three quarterly tests, the equity percentage is between the thresholds, and thus there is no rebalancing. At the two year mark, as shown at 360, the equity percentage is below the lower threshold of 30%, and thus the account is rebalanced such that the equity percentage is at the lower threshold.

Figure 4:
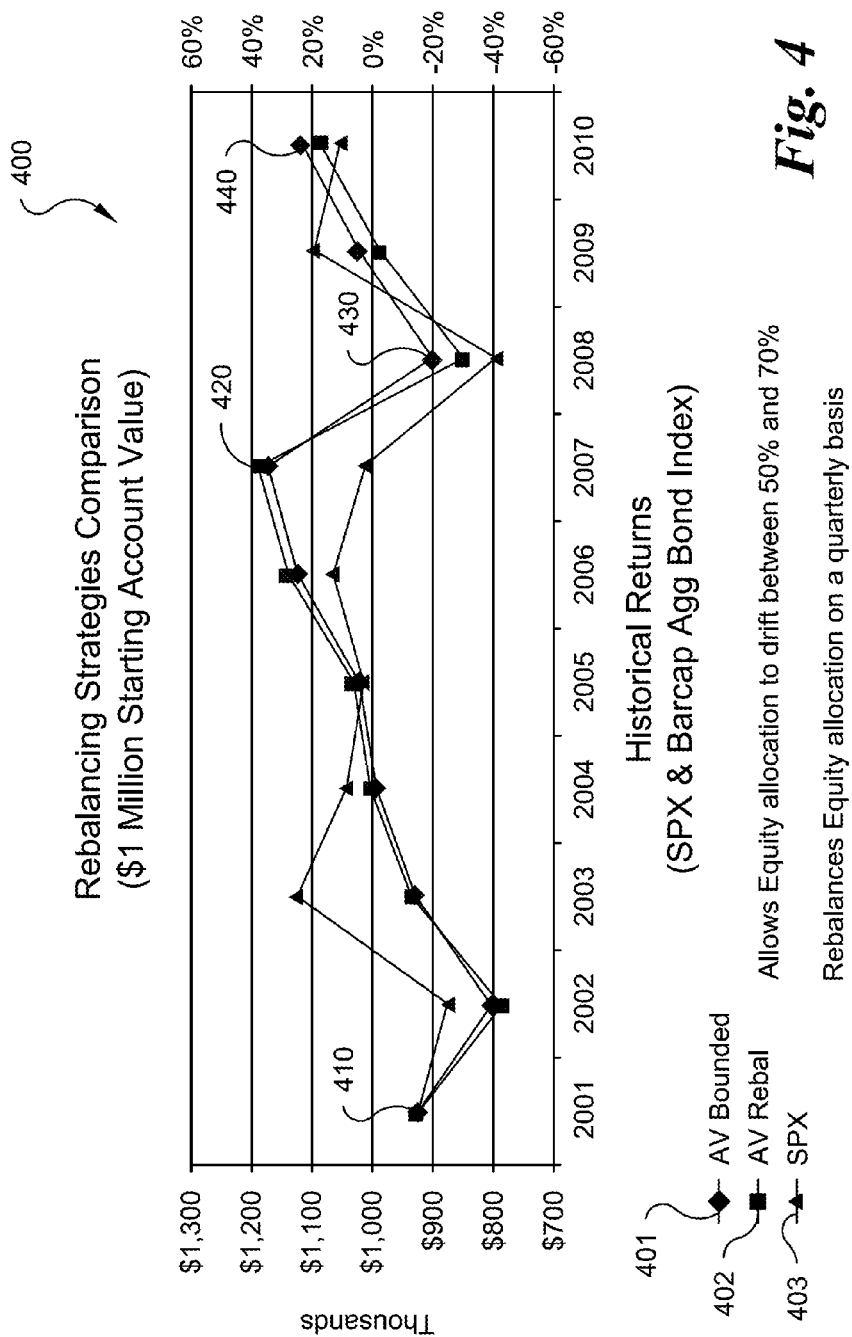
FIG. 4 is a chart showing exemplary investment performance of an implementation of the invention, a prior art method, and an equity index.

Referring now to FIG. 4, an example is shown of an exemplary test, using historical returns data. In this example, chart 400 displays: an account value 401, using a method of the invention, and bounding between 50% and 70% equity, between the Standard & Poor's 500 Index and the Barclays Capital U.S. Aggregate Bond Index; an account value 402, the Standard & Poor's 500 Index and the Barclays Capital U.S. Aggregate Bond Index but rebalanced at 70% equity; and percentage equity index returns 403, the Standard & Poor's 500 Index, shown on the right vertical axis, are plotted for the period from 2001 to 2010. The accounts are tested and rebalanced, if needed, on a quarterly basis. All three commence with the same value at 410. At 420, in approximately 2007, after several years of rising markets, the account 402, which is rebalanced to the target allocation on a quarterly basis, has slightly better returns than the account using a method of the invention. However, in 2008, at 430, after a period of equity decline, the account 401, using a method of the invention, has higher value than the account 402. At 440, in 2010, even after some period of equity market recovery, the account 401 still has a higher value.

Figure 5A:
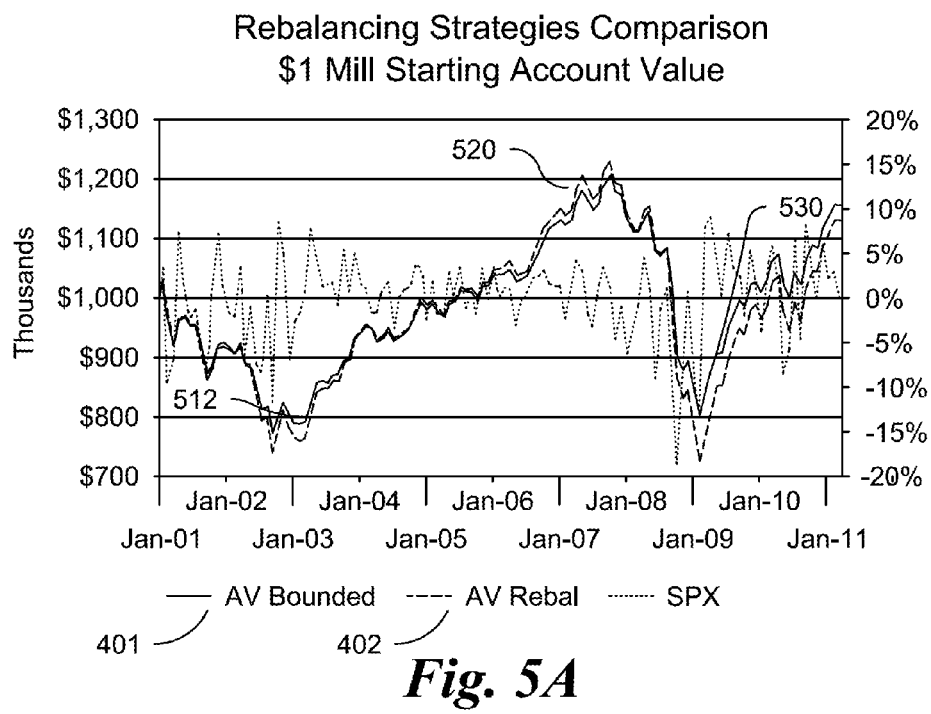
FIGS. 5A and 5B are charts showing exemplary investment performance and equity percentages of an implementation of the invention and a prior art method, with comparison to equity index returns.
Figure 5B:
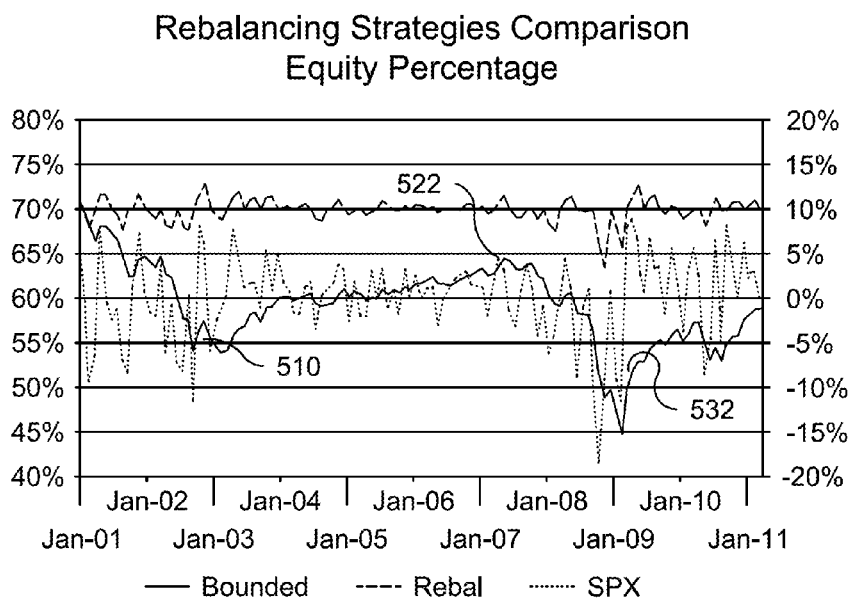

FIG. 5A shows the data of FIG. 4 in greater detail. As can be seen at 512, after a period of generally poor equity returns, account 401 has a higher value than account 402. Referring to FIG. 5, at 510, at approximately the same time as 512, the equity percentage of account 401 is around 55%, having decline from an initial percentage of 70%. At 520 in FIG. 5*a*, and 522 in FIG. 5B, account 401 has a slightly lower account value than account 402, and has an equity percentage that is about 64%. The lower exposure of account 401 than account 402 to equities during this period of rising values results in the greater value of account 402. After a period of equity market declines, at 530 on FIGS. 5A and 532 on FIG. 5B, the account 502 has been rebalanced, as the equity percentage dipped below 50%, and, as a result of its less exposure to equities, has a higher value than account 402.

Referring to FIG. 6, table 600 illustrates allocation of invested funds among three equity funds and two fixed income funds, for an embodiment of the invention in which allocations are compared to 50% and 70% thresholds on a quarterly basis, with two categories, fixed and equity, and three equity funds, and two fixed funds. The allocations to the individual funds serve as sub-allocations within the broader fixed and equity categories. Table 650 illustrates target allocations at the individual fund level for a method of the invention, in the row labeled "Rebal 70/30," in which the threshold proportions are 70% and 30%, as well as for a method of rebalancing to the target, labeled as "Rebal 50/50." While this example displays three equity funds and two fixed funds, the number of investments, and the nature of the investments as funds, are merely exemplary. As shown at row 610, when the allocations were tested in Quarter 4, the equity percentage is 74.3%, and thus exceeds the upper threshold. In rebalancing, shares are sold from both Fund B and Fund C, to reduce their respective percentages to target percentages, and shares are purchased in Fund D and Fund E, so as to increase their respective percentages to target percentages. Similarly, in quarter 7, shown at row 612, and Quarter 8, shown at row 614, the equity percentage is determined to be below the threshold percentage of 50%. In response, the account value is rebalanced. In addition to rebalancing between the equity and fixed categories, the account value is rebalanced within the categories to reach or approach a target allocation. In row 612, for example, the percentage of account value represented by Fund A is greater than the target, and so shares of Fund A are sold, simultaneously with purchase of shares of Fund B and Fund C, both equity funds, to increase the overall equity proportion to the lower threshold. In this embodiment, there is no rebalancing among funds within categories, if the equity percentage is between the upper and lower thresholds. However, in other embodiments, a system may be configured to rebalance between funds within categories, even if the category percentages are within the upper and lower thresholds.

In an embodiment, the systems of the present invention may be configured for administration of variable annuities during the accumulation phase. An annuity during the accumulation phase may also be referred to as "unannuitized." During the accumulation phase of an annuity, in general, the annuity has an account value available to the owner for withdrawal, subject to surrender charges and market value adjustments. Any payments made to the owner during the accumulation phase are generally by way of withdrawal, which withdrawal reduces the account value. Account value of a variable annuity during the accumulation phase varies with performance of investments.

Figure 7:
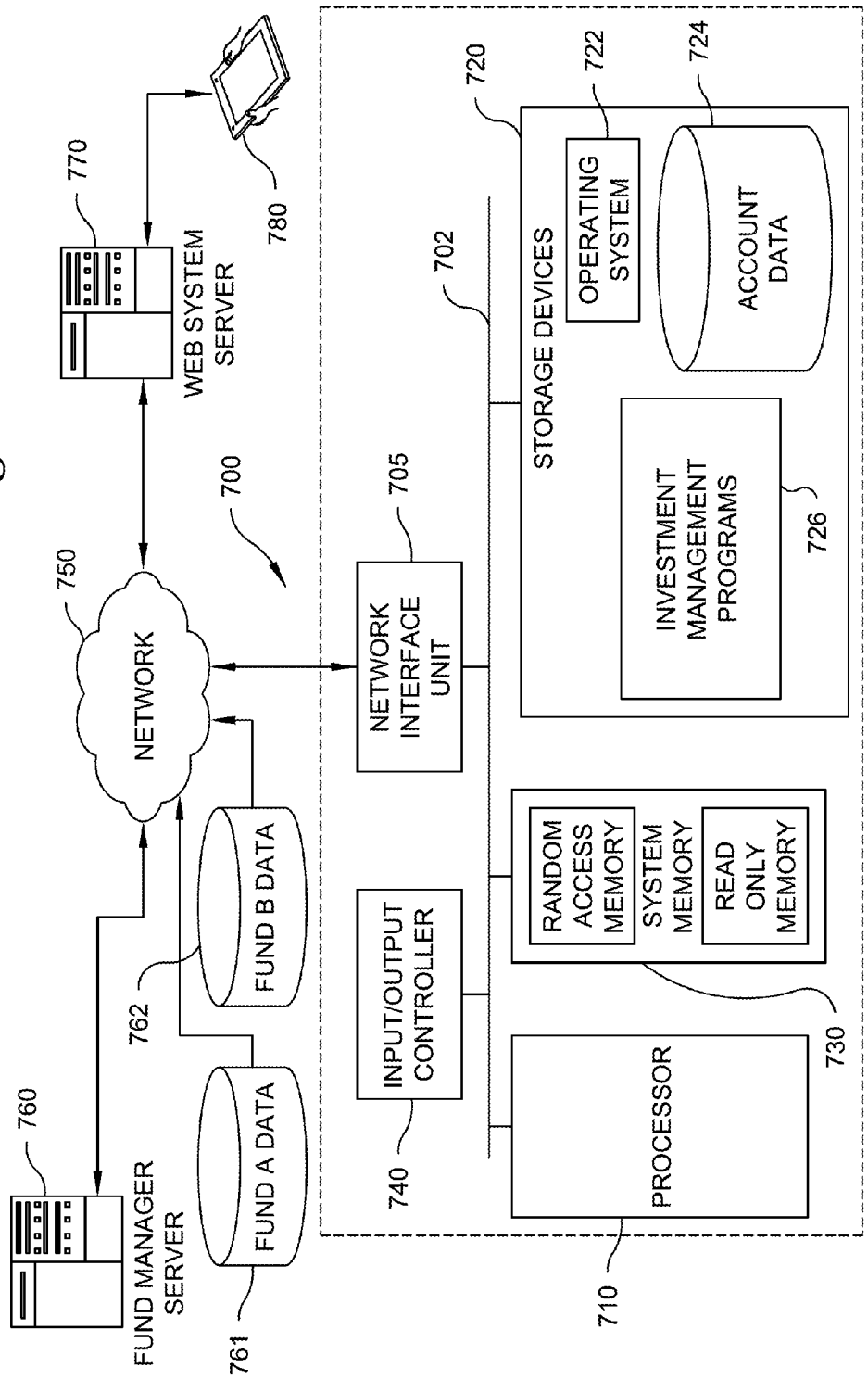
FIG. 7 is a schematic diagram of a computer system configured to implement an embodiment of the invention.

Referring to FIG. 7 an exemplary computer system 700 for use in an implementation of the invention will now be described. In computer system 700, processor 710 executes instructions contained in programs, such as investment management programs 726, stored in storage devices 720. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. Application program 726 may include separate modules for such functions as prompting a user, such as an employee of a financial services entity such as an insurance company, fund manager, or bank, by way of example, to input required data for initial setup of a new account, including identification of thresholds, period of testing investment allocation against thresholds, identities of funds or other investments within categories, initial investment amounts, identities of owners, financial advisors, beneficiaries and the like, and to perform verification of completeness and consistency of provided information, assign contract numbers to new annuity contracts, retrieve price data for funds, and the like. The system may be configured for determination and updating of account values, exchanging data with other systems, such as contract document generation systems, systems for administration of annuities during a payout phase, accounting systems; generation of statements; furnishing of data to printing and mailing systems, web servers and other systems for client communications; illustration calculation and generation systems; processing of withdrawals, including calculation of surrender charges and market value adjustments; determination of death benefits; and other functions. Storage devices 720 may include suitable non-transitory computer-readable media, such as optical or magnetic disks, fixed disks with magnetic storage (hard drives), flash memory, tapes accessed by tape drives, and other storage media. Processor 710 communicates, such as through bus 702 and/or other data channels, with network interface unit 705, system memory 730, storage devices 720 and input/output controller 740. Via input/output controller 740, processor 710 may receive data from user inputs such as pointing devices (including mice and trackballs), touch screens, audio inputs and keyboards, and may provide data to outputs, such as data to video drivers for formatting on displays, data to print drivers for transmission for printing in hard copy or to image files, and data to audio devices.

Storage devices 720 are configured to exchange data with processor 710, and may store programs containing processor-executable instructions, including instructions for implementing calculations employing algorithms, such as algorithms for determining account values by category, comparing category proportions to thresholds, and determining values of investments to be sold and values of investments to be purchased in response to identifying a breach of a threshold. Processor 710 is configured to perform steps in accordance with such processor-executable instructions. Processor 710 is configured to access data from storage devices 720, which may include connecting to storage devices 720 and obtaining data or reading data from the storage devices, or storing new and updated data into the storage devices 720. Storage devices 720 may include local and network accessible mass storage devices. Storage devices 720 may include media for storing operating system 722 and mass storage devices such as account data storage device 724 for storing data related to accounts, account owners, and the like.

Still referring to FIG. 7, in an embodiment, inputs may include user interfaces, including workstations having keyboards, touch screens, pointing devices such as mice and trackballs, or other user input devices, connected via networked communications to processor 710. Network interface unit 705 may communicate via network 750 with computer systems of other financial entities, such as fund manager server 760, which may receive instructions for purchase and sale of funds, and to other data storage devices, such as Fund A data storage device 761, and Fund B data storage device 762. For an account that is a variable annuity maintained by an insurance company, system 700 may communicate via network 750 with other insurance computer systems, such as systems for generating payments of withdrawals, payments of death benefits, and systems for administration of annuities following annuitization during the payout phase.

Network interface unit 705 may further communicate with computer systems such as websystem server 770, as well as computer systems of other entities, such as brokers and other financial advisers of account owners. Network interface unit 705 further permits receipt via network 750 of data indicative of values of funds and other investments from remote sources. In an embodiment, an account statement generation system may be in communication with system 700 and configured for using template forms and received or accessed data stored in account database 724 for creation of electronic and hard copy account statements, showing account balances, balances of individual investments, threshold percentages and categories, results of comparisons of proportions to thresholds, and rebalancing activity such as sale and purchase of fund shares, and other account-related data. The web system server 770 may generate web documents for display on consumer device 780, including data contained in reports, images of reports generated by an account statement generation system and other account-related data. In embodiments, a user from device 780 may send instructions via web system server 770 and network interface unit 705 to cause system 700 to take actions, such as processing withdrawals, processing additional investments, and other actions.

In embodiments, the functions of an account statement generation system may be incorporated in the functionality of computer system 700.

Network 750 may be or include wired or wireless local area networks and wide area networks, and over communications between networks, including over the Internet. Any suitable data and communication protocols may be employed.

Figure 8:
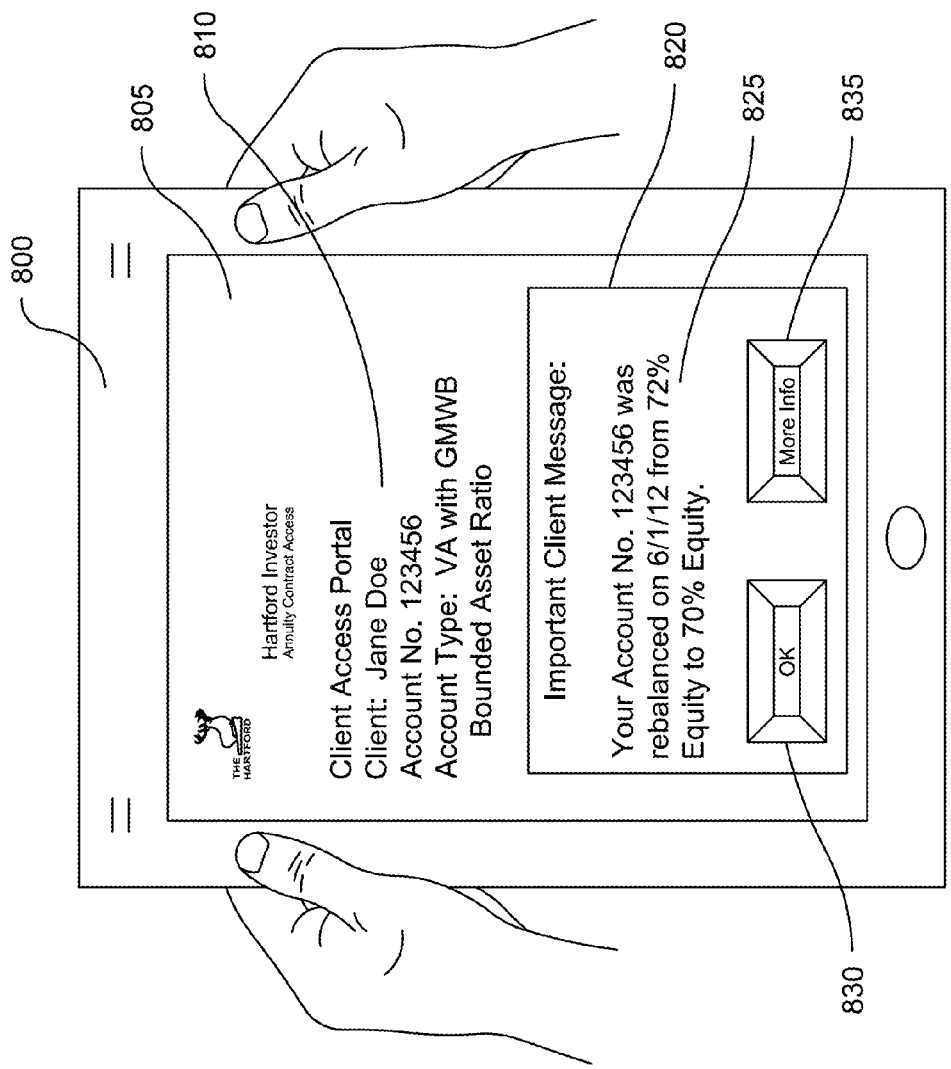
FIG. 8 illustrates a client device displaying a client message in accordance with an embodiment of the invention.

Referring to FIG. 8, an exemplary user device 800 is shown, displaying a screen generated by a system of an embodiment to generate data for an account owner. Device 800 may be a touch screen type device for viewing and accessing information and data related to the investment accounts as described herein. Touch screen device 800 can be an active sensor employing capacitive, resistive, inductive, or other methods, or it can be a passive surface on which touch sensing is accomplished by optical, acoustic, or other similar methods. Device 800 can also include a liquid crystal display (LCD), organic light emitting diode (OLED) display, electroluminescent display, or any other type of small display suitable for mounting in a portable computer or mobile device. Device 800 may be color or monochrome, and may include a backlight capability to enhance readability in various lighting conditions.

Device 800 may receive web document 805 via wireless connection via a wireless network, which is in communication via one or more networks such as the Internet with an investment management server. Web document 805 displays data indicative that the data is accessed via a client access portal, which may require suitable device and/or user authentication in order to access account data. Web document 805 displays data associated with the device and/or user and accessed from one or more databases, including client name, account number, and a type of account. The displayed type of account is a variable annuity, during the accumulation phase, with a guaranteed minimum withdrawal benefit, and a bounded asset ratio. Web document 805 includes a message portion 820 which displays client message 825 having data informing the client that the account was rebalanced from 72% equity to 70% equity. This example is consistent with an account having an equity category with an upper threshold of 70% of account value. The web document further displays two options for the user, an OK button 830 for simple acknowledgement of the message, or a "More info" button, which causes data to be forwarded to a web server and a system server to retrieve more data. The additional data may simply be a general description of the rebalancing concept, or may include additional data, such as particular fund values sold and fund values purchases for this account.

Figure 9:
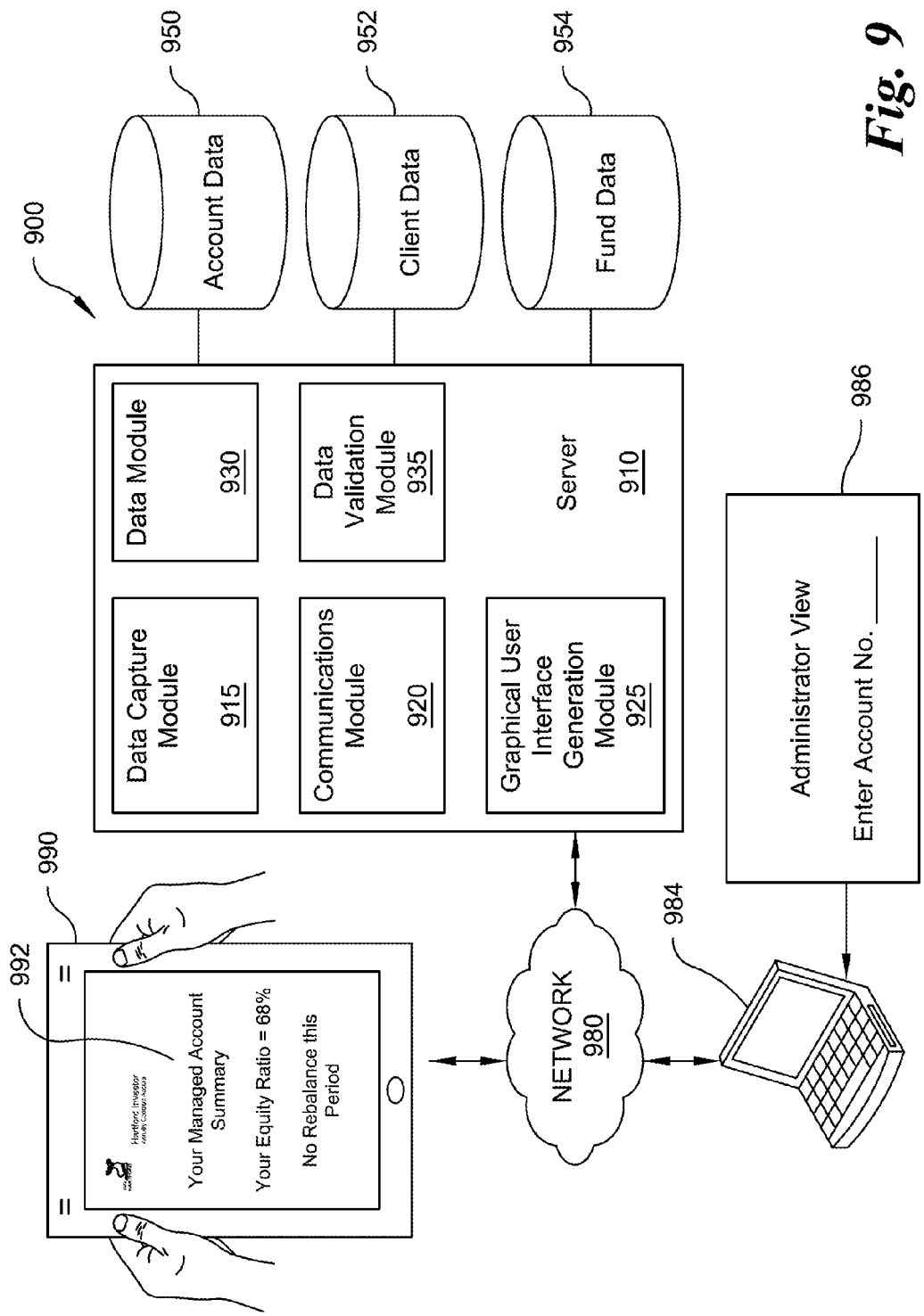
FIG. 9 is a schematic diagram of a hardware server networked with user devices configured to implement an embodiment of the invention.

Referring now to FIG. 9, another exemplary embodiment of a system 900 of the present invention is shown. System 900 includes a financial services company hardware server 910 which includes one or more engines or modules which may be utilized to perform one or more steps or functions of embodiments of the present invention. In an embodiment, the present invention is implemented as one or more modules of a computer software program in combination with one or more components of hardware. Such software programs will be used when a system user, such as an employee of the financial services company, or an account owner or representative, has sent a request for data or information to a server and comprises part of the processing done on the server side of the network. Such software programs may also operate, such as on a daily basis, to perform batch processing of data related to accounts. For example, a daily batch run may include identifying all annuity contracts that have reached a date for comparison of proportions of categories of investments to upper and lower thresholds, and performing of calculation of values of categories, percentages associated with categories, comparison of percentages with thresholds, determination of investment amounts to be sold and purchased to accomplish rebalancing responsive to a breach of an upper or lower threshold, and generation of instructions to fund companies for purchase and sale of fund shares, for example. The programs may be used in an Internet environment, where the server is a Web server and the request is formatted using HTTP (or HTTPS). Alternatively, the server may be in a corporate intranet, extranet, or any other type of network. Use of the term "Internet" herein, when discussing processing associated with the user's request, includes these other network environments, unless otherwise stated. Additionally, a graphical user interface or other module may be implemented as an intelligent hardware component incorporating circuitry including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. One or more functions of a web client or other module may be implemented as application software in the form of a set of processor-executable instructions stored in a memory of a client device, such as tablet computer 990 or laptop 984, and capable of being accessed and executed by a processor of the client device.

Referring still to FIG. 9, server 910 includes a data capture or input/output module 915, a communications module 920, a dynamic display generation or graphical user interface module 925, a data module 930, and a data validation module 935. Data module 930 is in further communication with a number of databases such as account database 950, client database 952 and fund database 954. Account database may include account data, including in target date fund embodiments threshold values and associated dates or time periods until the target date of the target date fund. The thresholds for equity proportions generally will decrease as the target date of the target date fund is closer. Databases 950, 952, 954 may be implemented in one or more physical data storage devices in communication with server 910, or may be implemented in remote data storage devices accessible over one or more networks, such as cloud computer servers accessible via the Internet. Databases in communication with server 910 may include both internal and/or external/third party databases. By way of example, external databases may include databases maintained by fund managers that provide fund value data. Server 910 may be configured for bulk upload of data, such as bulk upload of fund price data from fund manager computer systems on a daily basis. Such data may be furnished such as via a spreadsheet file or via suitable xml documents, by way of example. Data may be exchanged between server 910 and one or more legacy systems via suitable middleware systems. One or more modules, such as data validation module 935, may be configured to perform data validation steps prior to storing bulk uploaded data. Server 910 may further be configured to permit bulk download of data, such as account data of clients of a broker or financial services retailer, to a device of suitably-authorized user.

In operation, server 910 is in communication with client devices, such as laptop computer 984 or tablet computer 990 via network 980 which facilitates interaction with server 910 through one or more graphical user interfaces as shown and described herein. As used herein, devices, such as client devices 984, 990 may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Referring still to FIG. 9, utilizing client devices 984, 990, a properly authenticated system user, such as an account owner or financial advisor, may view account data, and initiate account transactions, such as investment of additional funds or withdrawal of funds, and generation of printed statements. By way of example, display 992 may be provided showing data relating to a managed account, including a result of calculation of a proportion of investments in a category, and whether any rebalancing is required for a recent period, such as a just-expired calendar quarter, based on the calculations. This may be calculated using a module running on server 910. An application program running on tablet computer 990 may be configured to prompt a user for available actions, such as generating forecasts of future account value based on various assumptions as to equity prices and fixed income prices, permitting instructions for withdrawals, instructions for change of beneficiary, determination of death benefit amount based on a selected exemplary date of death of the owner, and other actions. Data indicative of instructions input by a user on tablet computer 990 may be uploaded to server 910, which then may implement the instructions in accordance with processor-executable instructions. Alternatively, server 910 may be configured to generate data indicative of web documents for display on device 990 to verify instructions prior to commencement of processing. Server 910 may further generate data for transmission to device 990 which is displayed by an application program to confirm that the instruction has been received and is being implemented. Server 910 may be configured to confirm such activities in other manners, such as by sending electronic e-mail or text messages, sending instructions for printing and mailing of physical letters to account owners, and other suitable methods.

By way of further example, the server 910 may be configured to generate and display administration system screen 986 on laptop 984 to a suitably authenticated user, such as an employee of the financial services company. The administrative system may show owner, beneficiary and broker information, as stored in account database 950, for an employee to review, verify or update, such as on establishment of a new account, or in response to a telephone inquiry from an account owner or broker.

A properly authenticated individual, such as an employee of a financial services company having administrative responsibilities, may access further data and provide updates and modifications to data. For example, the financial services company may be in some embodiments contractually permitted to change the thresholds, within limits, change permitted funds, or other data. Such a properly authenticated user may further be able to implement updates to processing logic. In embodiments of the present invention, one or more of the above modules, may also be implemented in combinations of software and hardware for execution by various types of computer processors coupled to such hardware.

As used herein, a module of executable code may, for instance, comprise one or more physical or logical blocks of computer instructions which may, for instance, be organized as an object, procedure, process or function. Nevertheless, the executables of an identified module need not be physically located together, but may comprise separate instructions stored in different locations which, when joined logically together, define the module and achieve the stated purpose for the module such as implementing the determination of whether a category has breached a threshold and the sales and purchases required in response for rebalancing, as well as other business rules logic prescribed by the present system. In embodiments of the present invention a module of executable code may be a compilation of many instructions, and may be distributed over two or more different code partitions or segments, among different programs, and across two or more devices. Similarly, data, including by way of example account data, threshold data, and fund data, may be identified and illustrated herein within modules, and may be embodied in any suitable form and organized within any suitable type of data structure. Such data may be collected as a single data set, or may be distributed over different locations including over different storage devices, and may exist, at least partially, merely as electronic signals on a system and/or network as shown and described herein.

A processor may provide the central processing unit (CPU) functions of a computing device on one or more integrated circuits. The term "processor" may include multi-core processors and central processing units including multiple microprocessors. The central processing unit functionality may be provided at one or more remote locations, such as through application service provider and cloud computing services.

In embodiments, a processor may provide an output signal having data indicative of one or more data items. An output signal may be carried either over a suitable medium, such as wire or fiber, or wirelessly. An output signal may transmit data from one device to another directly, such as over a bus of a computer system from a processor to a memory device, or indirectly, such as over multiple networks, and with intermediate steps of storage in a buffer or memory device and retransmission. Such an output signal may be provided by the processor to a bus of a computer system together with address data at a series of clock intervals. The address data may designate a destination device on a bus, by way of example. In embodiments, an output signal may be a signal output from a hardware communications device of a computer system to a network, such as a local area network, a wide area network, or a network of interconnected networks, such as the Internet. Output signals may include, by way of example, data identifying formats, fields, and content of fields. Signals may be compatible with any appropriate format. For example, data may be formatted in accordance with a data format for insurance data, such as an ACORD compatible format, or a non-ACORD xml format. Reference to an output signal having particular data may include one or more signals bearing the information. Multiple signals bearing the information may include sequences of digital data bearing the information interleaved with sequences of digital data relating to other information. By way of example, a signal may be packetized for transmission. By way of further example, an output signal may take the form of an uncompressed digital signal or a compressed digital signal.

A system on which the methods of embodiments of the present invention may be implemented includes at least one central processing computer or computer network server. A network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, a network server may be a standalone server computer or alternatively, the functions of a network server may be distributed across multiple computing systems and architectures.

A network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include hard magnetic disk drives, optical storage units, CD-ROM drives, or flash memory, by way of example. Data storage devices contain databases used in processing calculations embodied in algorithms, including data for display on client devices and data for determination of proportions and determinations of whether thresholds have been breached. In one embodiment, database software creates and manages these databases. Calculations and/or algorithms in accordance with an embodiment of the present invention may be stored in storage devices and accessed and executed by a processor.

Suitable computer program code may be provided for performing numerous functions such as producing reports for review by financial services company personnel and auditors indicative of details of calculations performed and rebalancing activities, and other functions. The functions described above are merely exemplary and should not be considered exhaustive of the type of function which may be performed by the computer program code of embodiments of the present inventions.

The computer program code required to implement the above functions (and the other functions described herein) can be developed by a person of ordinary skill in the art, and is not described in detail herein.

The data as to determinations of threshold breaches and rebalancing may be stored in a database, such as account database 950 of FIG. 9, by server 910, and provided to the account owner via a client communication system. Client communication systems may include webservers and printed statement generation systems, and may be configured for generation and communication to users of printed and electronic messages, statements and reports. A user, such as an owner or co-owner, or broker or other financial advisor of an owner, after suitable authentication, may access data via a networked user device, such as tablet computer 990, in communication with a webserver. The webserver in turn fetches data related to the account associated with the user from server 910, renders the data in a suitable format, such as using appropriate html code, selects a suitable template, populates the template with suitable data and template images, and provides the suitable image for display on a user device such as tablet computer 990.

The client communication system may be a statement printing system including a plurality of printers for printing statements, which statements are formatted to include data determined by a server, such as contract or account number, owner name, anniversary date, account value, categories, category thresholds, amounts invested and dates of investments, and in the case of a target date fund, dates of changes in category thresholds, and other data. Systems for printing, folding, envelope stuffing and application of postage using automated postage meters may be employed, supplied by Neopost or other vendors.

The servers described herein may be in communication with systems including payment systems for effecting payments of withdrawals to owners.

The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of embodiments of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

An exemplary advantage of a method and system of the present invention is that an investor and/or a guarantor may ameliorate losses in account value during periods of losses of value in equity markets, as compared to systems in which accounts are rebalanced to a particular proportion.

While particular embodiments of the invention have been illustrated and described, various modifications and combinations can be made without departing from the spirit and scope of the invention, and all such modifications, combinations, and equivalents are intended to be covered and claimed.

What is claimed is:

1. A computer system for processing data related to investment management, comprising:
   one or more data storage devices storing data associated with a plurality of investment accounts, the data indicative of the investment accounts including, for each investment account: an account value; a plurality of investments and, for each of the investments, one of a plurality of categories associated with the investments and a value of the investments; and
   an investment management hardware server, in communication with the one or more data storage devices, and configured to, for each of the investment accounts:
   access the stored data indicative of the investments;
   determine a value of the investments in at least one of the plurality of categories;
   determine a proportion of the value of the investments in the at least one of the plurality of categories to the account value;
   determine whether the determined proportion is in breach of either of an upper threshold proportion and a lower threshold proportion;
   responsive to determining that the determined proportion is in breach of either the upper threshold proportion or the lower threshold proportion, provide output data to a fund manager computer system with instructions to automatically reallocate value between the categories so as to change the determined proportion to a predetermined allocation; and
   responsive to determining the determined proportion is not in breach of either the upper threshold proportion or the lower threshold proportion, output data indicative of maintaining current category balances.

2. The computer system of claim 1, wherein the predetermined allocation is equal to the breached one of the upper or lower threshold proportion.

3. The computer system of claim 1, wherein the predetermined allocation is between the upper and lower threshold proportions.

4. The computer system of claim 1, further comprising a webserver in communication with the investment management hardware server configured to receive data indicative of a determination to reallocate value between the categories and to permit a client device to access data indicative of the determination to reallocate value between the categories for display to a user.

5. The computer system of claim 1, wherein the plurality of categories comprise an equity category and a fixed category.

6. The computer system of claim 5, wherein the plurality of categories further comprise at least one of a real estate category and a hedging category.

7. The computer system of claim 5, wherein the upper threshold proportion for the equity category is between 60% and 90%, inclusive, and the lower threshold proportion for the equity category is between 40% and 70%, inclusive.

8. The computer system of claim 1, wherein the data associated with a plurality of investment accounts comprises data indicative of a plurality of funds available for investment in a variable annuity contract during the accumulation phase, and the plurality of categories comprise equity and non-equity.

9. The computer system of claim 8, wherein the annuity administration hardware server is further configured to, responsive to a determination that the determined proportion of the equity category is in excess of the upper threshold proportion, provide an instruction to at least one fund manager to sell shares of a fund in the equity category, and to provide an instruction to at least one fund manager to purchase shares of a fund in the non-equity category.

10. The computer system of claim 1, wherein the investment manager hardware server is configured to compare the determined proportion to at least one of the thresholds on a periodic basis, the period being between one week and one quarter, inclusive.

11. A computer-implemented method for processing data relating to investment management, comprising:
   accessing by an investment manager hardware server from a data storage device stored data indicative of investments, the stored data comprising data associated with a plurality of investment accounts, the data indicative of the investment accounts including, for each investment account: an account value; a plurality of investments and, for each of the investments, one of a plurality of categories associated with the investments and a value of the investments;
   determining by the server a value of the investments in at least one of the plurality of categories;
   determining by the server a proportion, of the value of the investments in the at least one of the plurality of categories, to the account value;
   determining by the server whether the determined proportion is in breach of either of an upper threshold proportion and a lower threshold proportion;
   responsive to determining that the determined proportion is in breach of either the upper threshold proportion or the lower threshold proportion, providing by the server output data to a fund manager computer system with instructions to reallocate value between the categories so as to change the determined proportion to a predetermined allocation; and
   responsive to determining that the determined proportion is not in breach of either the upper threshold proportion or the lower threshold proportion, outputting by the server data indicative of maintaining current category balances.

12. The computer-implemented method of claim 11, wherein the investment management hardware server is configured to process data relating to a target date fund, and wherein the system is configured to determine a current upper threshold proportion and a current lower threshold proportion based upon stored upper and lower threshold data and associated dates.

13. The computer-implemented method of claim 11, wherein the plurality of categories comprise at least two of an equity category, a fixed category, a real estate category and an equity hedge category.

14. The computer-implemented method of claim 11, wherein the predetermined allocation is equal to the breached threshold proportion.

15. The computer-implemented method of claim 11, wherein the data comprises data associated with a target date fund, including a plurality of upper and lower thresholds and associated dates.

16. The computer-implemented method of claim 11, further comprising receiving by a webserver the data indicative of the instructions to reallocate, and providing by the webserver the data indicative of the instructions to a client device for display.

17. A non-transitory computer-readable medium, the computer-readable medium having processor-executable instructions stored thereon relating to processing of data for investment accounts, which instructions, when executed by the processor, cause the processor to:

access from a data storage device stored data indicative of investments, the stored data comprising data associated with a plurality of investment accounts, the data indicative of the investment accounts including, for each investment account: an account value; a plurality of investments and, for each of the investments, one of a plurality of categories associated with the investments and a value of the investments;

determine a value of the investments in at least one of the plurality of categories;

determine a proportion, of the value of the investments in the at least one of the plurality of categories, to the account value;

determine whether the determined proportion is in breach of either an upper threshold proportion or a lower threshold proportion;

responsive to determining that the determined proportion is in breach of either the upper threshold proportion or the lower threshold proportion, provide output data to a fund manager computer system with instructions to reallocate value between the categories so as to change the determined proportion to a predetermined allocation; and responsive to determining the determined proportion is not in breach of either the upper threshold proportion or the lower threshold proportion, output data indicative of maintaining current category balances.

18. The non-transitory computer-readable medium of claim 17, wherein the plurality of categories comprise two or more of an equity category, a fixed category, and a real estate category.

19. The non-transitory computer-readable medium of claim 17, wherein the instructions further cause the processor to compare the determined proportion to at least one of the thresholds on a periodic basis, the period being between one week and one quarter, inclusive.

20. The non-transitory computer-readable medium of claim 17, wherein the instructions further cause the processor to reallocate value among a plurality of funds within one of the plurality of categories.

\* \* \* \* \*